United States Patent
Yamanaka et al.

(10) Patent No.: US 6,767,967 B2
(45) Date of Patent: Jul. 27, 2004

(54) PSEUDO CROSS-LINK TYPE RESIN COMPOSITION, MOLDING MATERIAL, SHEET OR FILM, AND OPTICAL ELEMENT OBTAINED THEREFROM

(75) Inventors: Tetsuro Yamanaka, Ichihara (JP); Yukihiko Yamashita, Ichihara (JP); Kenji Kanemaru, Ichihara (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/171,626

(22) Filed: Jun. 17, 2002

(65) Prior Publication Data

US 2003/0232923 A1 Dec. 18, 2003

(51) Int. Cl.[7] ............................................. C08F 210/02
(52) U.S. Cl. ........................ 525/221; 525/191; 525/218; 525/73; 525/78; 525/79
(58) Field of Search ................................ 525/191, 203, 525/48, 73, 78, 79

(56) References Cited

U.S. PATENT DOCUMENTS 5,369,169 A * 11/1994 La Fleur et al. ............... 525/57

FOREIGN PATENT DOCUMENTS

| EP | 0089086 | 9/1983 |
|---|---|---|
| JP | 56-45421 | 10/1981 |
| JP | 3-52910 | 3/1991 |
| JP | 4-6738 | 2/1992 |

OTHER PUBLICATIONS

CRC Handbook of Chemistry and Physics, Ed. David R. Lide, CRC Press, 1998–1999, pp. 13–4, 13–5, 13–6, 13–7.*

* cited by examiner

Primary Examiner—David W. Wu
Assistant Examiner—Satya Sastri
(74) Attorney, Agent, or Firm—Antonelli, Terry, Stout & Kraus, LLP

(57) ABSTRACT

A pseudo cross-link type resin composition made of one of resins or a mixture of the resins;

wherein the resin is obtained by mixing a polymer molecule that has an atomic group capable of forming an intermolecular hydrogen bond at least in a molecular side chain or at a molecular tail end of the polymer molecule, and a polymer molecule that has an atomic group capable of forming an intermolecular hydrogen bond at lest in a molecular side chain or in a molecular skeleton of the polymer molecule;

wherein the polymer molecule having an atomic group capable of forming an intermolecular hydrogen bond at least in a molecular side chain or at a molecular tail end is a vinylic polymer or a copolymer thereof that has a carboxyl group or a hydroxyl group at least in a molecular side chain or at a molecular tail end, and the polymer molecule that has an atomic group capable of forming an intermolecular hydrogen bond at least in a molecular side chain or in a molecular skeleton is a vinylic polymer or a copolymer thereof having at least one or more nitrogen atoms in a molecular side chain or in a molecular skeleton; and wherein when these polymers or copolymers are mixed together, the intermolecular hydrogen bond is formed therebetween.

8 Claims, No Drawings

PSEUDO CROSS-LINK TYPE RESIN COMPOSITION, MOLDING MATERIAL, SHEET OR FILM, AND OPTICAL ELEMENT OBTAINED THEREFROM

CROSS REFERENCE TO RELATED APPLICATIONS

The present application is an application based on Japanese Patent Application No.2000-226880, previously filed by the same applicant on Jul. 27, 2000 and disclosed on Feb. 6, 2002; the entire contents of which are incorporated herein by reference.

BACKGROUND OF THE INVENTION

1. Field of the Invention

The present invention relates to novel pseudo cross-link type polymer molecules and resin compositions made of mixtures of these polymer molecules.

2. Description of the Related Art

Recently, researches and developments of synthetic resins have accomplished great advances, and synthetic resins having various performances have been obtained. Among such researches and developments, there are many approaches that, without damaging resins' intrinsic performances, intend to endow existing synthetic resins with new performances.

As atypical synthetic polymer molecule material, acrylic resin or styrenic resin can be cited. These synthetic resins have various excellent characteristics such that these resins are relatively cheap, superior in transparency, can be relatively easily manufactured into polymers having various characteristics from rubber-like materials to glass-like polymers, and can be easily modified. On the other hand, there remain large problems in compatibility between mechanical strength, heat resistance and toughness, and improvement thereof. The deficiency of the toughness is a problem common to an entirety of acrylic resins. Accordingly, there are several reports that teach how to overcome these problems. For instance, it is known to mix rubber particles in a resin (Japanese Patent Application Publication Nos. 58-167605 and 3-52910). However, these methods cannot overcome a blushing phenomenon that occurs when a resin is folded (folding property). At present, an acrylic resin that can combine a glass transition point that is equal to or more than room temperature and an ability to form a tough thin film (folding property) has not been found.

Furthermore, as a typical aromatic polyamide resin, polyparaphenylene terephthalamide can be cited. It has particularly excellent crystallinity, a higher melting point and excellent flame resistance, and furthermore owing to a rigid molecular structure, a higher mechanical strength, a lower linear expansion coefficient and so on. However, there is a problem in that it is very difficult to dissolve in an organic solvent, accordingly an inorganic strong acid such as concentrated sulfuric acid or the like has to be used as a solvent. It is known that fibers spun from a thick solution of such as concentrated sulfuric acid or the like have very high mechanical strength and elasticity, and are industrially put into practical use. However, applications into films are hardly found, and in one example it is reported that only a swollen state allows to be drawn (Japanese Patent Application Laid-Open No. 4-6738). In the method, there are problems in that since a manufacturing process is extremely complicated, productivity is lowered, and product prices become higher. As a method that allows improving the solubility in organic solvents, it is known that when monomers in which a halogen group is introduced in an aromatic nucleus or monomers high in flexibility are copolymerized, its solubility into organic solvents can be improved (Japanese Patent Application Publication No. 56-45421). However, in this method, since the price of the monomer becomes higher, product prices become higher, higher heat resistance and flame resistance may be damaged, and in addition to the above, there is a problem in that halogen atoms may cause metal corrosion.

A liquid crystalline polymer, in order to exhibit a liquid crystal state in a molten state, has higher elasticity and mechanical strength, and furthermore a lower linear expansion coefficient in an orientation direction. However, as common problems to the liquid crystal polymers, there are disadvantages such that the aforementioned performances are extremely lower in a vertical direction to the orientation direction, mechanical strength at a meeting point of a molten resin that is generated when a molded body is obtained by use of injection molding and called as weld is extremely low, and furthermore a surface of the molded body is peeled in layers. However, at present, solutions of the problems are not known.

A polymer alloy material, which aims to obtain a new performance by mixing different kinds of polymer molecule materials, has been prepared by mixing polymer molecules different in affinity by help of a compatibility agent. Since the method is a technology that aims to reduce a surface energy by use of the compatibility agent, it can control a dispersion state that causes an island structure but cannot attain a completely compatible state. There have been no reports in which different kinds of polymer molecules are made completely compatible. In addition, there are problems in that since the compatibility agent is relatively expensive, the product prices become higher; when the polymer alloy material is used for long, the compatibility agent breeds out on a surface and thereby contamination is caused; and the dispersion state of the polymer alloy material may change.

Since thermosetting resins are generally insoluble and infusible cured-materials, these are particularly excellent in solvent resistance or durability such as strength maintenance rate or the like under high temperatures. However, since cross-links are formed through covalent bonds, there is a problem in that the thermosetting resins cannot be reproduced. Accordingly, there is a big disadvantage in securing recycle properties thereof. As one that is most close to thermosetting resins that can be recycled, ionomer resins can be cited. In the ionomer resin, a metal oxide or metal hydroxide such as magnesium oxide or calcium hydroxide is added to a polymer having a carboxyl group in its side chain. By forming an ionic bond between the metal and the carboxyl group, a pseudo cross-link point is formed. In the method, although a certain degree of improvement in heat resistance and toughness can be obtained, according to reasons such that a bonding force between the metal compound and the carboxyl group is weak, owing to lower solubility of the metal compound in the resin only a slight amount can be added, and so on, a larger improvement in characteristics cannot be obtained.

Furthermore, among the thermosetting resins polyimide resins have extremely high heat resistance and tough film performance, accordingly are industrially extremely useful materials. When processing polyimide into a film, in general a polyimide solution is coated, followed by heating at a high temperature, and thereby an imide ring is formed. In addition, when the imide ring is once formed, solubility in a solvent is extremely lowered. This becomes a disadvantage when the polyimide is recycled. Accordingly, materials that can combine high solubility in a solvent and high heat resistance are in demand. A method is known in which by copolymerizing monomers in which a substituent group such as an alkyl group or the like is introduced in an aromatic nucleus, the solubility in an organic solvent is improved. However, by the method, materials having a glass transition temperature equal to or more than 320° C. have not been obtained.

Furthermore, in the method, since monomer price is expensive, there is a problem in that the product price becomes higher.

Accordingly, polymer molecules that can be easily polymer mixed, can exhibit a new performance, and thereby enables to combine in particular contrary characteristics or resin compositions made of mixtures thereof are in demand.

SUMMARY OF THE INVENTION

The present inventors have studied hard to overcome the aforementioned problems and have found the following. That is, the present inventors have found that when particular functional groups are introduced in combination in various polymer molecules, hydrogen bonds are formed in the polymer molecule owing to an interaction between the functional groups, thereby a pseudo-structure with a cross-link structure may be given, a new performance may be easily given to a resin composition, and a resin composition that can combine contrary performances in particular can be prepared. As a result, the present invention is attained.

That is, the present invention relates to the following items.

(1) A pseudo cross-link type resin composition made of one of resins or a mixture of the resins; wherein the resin is obtained by mixing a polymer molecule that has an atomic group capable of forming an intermolecular hydrogen bond in a molecular side chain and/or at a molecular tail end of the polymer molecule, and a polymer molecule that has an atomic group capable of forming an intermolecular hydrogen bond in a molecular side chain and/or in a molecular skeleton of the polymer molecule; wherein the polymer molecule having an atomic group capable of forming an intermolecular hydrogen bond in a molecular side chain and/or at a molecular tail end is a vinylic polymer and/or copolymer that has a carboxyl group or a hydroxyl group in a molecular side chain and/or at a molecular tail end, and the polymer molecule that has the atomic group capable of forming an intermolecular hydrogen bond in a molecular side chain and/or in a molecular skeleton is a vinylic polymer and/or copolymer having at least one or more nitrogen atom in a molecular side chain and/or a molecular skeleton; and wherein when these polymers and/or copolymers are mixed together, the intermolecular hydrogen bond are formed therebetween, and thereby a pseudo cross-link type resin composition made of one of the resins or a mixture thereof can be obtained.

(2) A pseudo cross-link type resin composition disclosed in (1); wherein the vinylic polymer and/or copolymer that has a carboxyl group or a hydroxyl group in a molecular side chain and/or at a molecular tail end and the vinylic polymer and/or copolymer having at least one or more nitrogen atoms in a molecular side chain and/or in a molecular skeleton are different in their glass transition temperatures; and wherein when these vinylic polymers and/or copolymers are mixed together, the pseudo cross-link type resin composition disclosed in (1) can be endowed with flexibility.

(3) A pseudo cross-link type resin composition disclosed in (1); wherein one of the vinylic polymer and/or copolymer that has a carboxyl group or a hydroxyl group in a molecular side chain and/or at a molecular tail end and the vinylic polymer and/or copolymer that has at least one or more nitrogen atoms in a molecular side chain and/or in a molecular skeleton has a glass transition temperature equal to or lower than room temperature and the other one has a glass transition temperature equal to or higher than room temperature; and wherein when these vinylic polymers and/or copolymers are mixed, the pseudo cross-link type resin composition disclosed in (1) can be endowed with flexibility.

(4) A molding material obtained by molding the pseudo cross-link type resin composition disclosed in (1).

(5) Film obtained from the pseudo cross-link type resin composition disclosed in (1).

(6) Sheet obtained from the pseudo cross-link type resin composition disclosed in (1).

(7) An optical element in which the molding material in (4), the sheet or the film is used.

(8) An optical element in which the molding material in (5), the sheet or the film is used.

(9) An optical element in which the molding material in (6), the sheet or the film is used.

According to the present invention, by mixing polymers having atomic groups capable of forming intermolecular hydrogen bond, a method that allows easily manufacturing a polymer mixture may be provided.

Furthermore, according to the present invention, a method that can endow the polymer or the copolymer after the mixing with flexibility can be provided.

Still furthermore, the present invention can provide the polymer or the copolymer with heat resistance, mechanical strength, optical properties and so on.

Furthermore, the present invention relates also to the following items.

(2-1) A pseudo cross-link type resin composition made of one of resins or a mixture of the resins;

wherein the resin is obtained by mixing a first polymer molecule that has an atomic group capable of forming an intermolecular hydrogen bond at least in a molecular side chain or at a molecular tail end of the polymer molecule, and a second polymer molecule that has an atomic group capable of forming an intermolecular hydrogen bond at least in a molecular side chain or in a molecular skeleton of the polymer molecule;

wherein the first polymer molecule having an atomic group capable of forming an intermolecular hydrogen bond at least in a molecular side chain or at a molecular tail end is a vinylic polymer or a copolymer thereof that has a carboxyl group or a hydroxyl group at least in a molecular side chain or at a molecular tail end, and the second polymer molecule that has an atomic group capable of forming an intermolecular hydrogen bond at least in a molecular side chain or in a molecular skeleton is a vinylic polymer or a copolymer thereof having at least one or more nitrogen atoms in a molecular side chain or in a molecular skeleton; and wherein when the first and second polymers or copolymers thereof are mixed together, the intermolecular hydrogen bond is formed therebetween.

(2-2) A pseudo cross-link type resin composition disclosed in (2-1);
   wherein the vinylic polymer or the copolymer thereof that has a carboxyl group or a hydroxyl group at least in a molecular side chain or at a molecular tail end and the vinylic polymer or the copolymer thereof having at least one or more nitrogen atoms at least in a molecular side chain or in a molecular skeleton are different in their glass transition temperatures; and
   wherein when these vinylic polymers or copolymers thereof are mixed together, a flexible pseudo cross-link type resin composition disclosed in (2-1) is obtained.
(2-3) A pseudo cross-link type resin composition disclosed in (2-1);
   wherein one of the vinylic polymer or the copolymer thereof that has a carboxyl group or a hydroxyl group at least in a molecular side chain or at a molecular tail end and the vinylic polymer or the copolymer thereof having one or more nitrogen atoms at least in a molecular side chain or in a molecular skeleton has a glass transition temperature equal to or lower than room temperature, and another has a glass transition temperature equal to or higher than room temperature; and
   wherein when these vinylic polymers or copolymers thereof are mixed together, the pseudo cross-link type resin composition disclosed in (2-1) is endowed with flexibility.
(2-4) A molding material obtained by molding the pseudo cross-link type resin composition disclosed in the (2-1).
(2-5) Film obtained from the pseudo cross-link type resin composition disclosed in (2-1).
(2-6) Sheet obtained from the pseudo cross-link type resin composition disclosed in (2-1).
(2-7) An optical element in which the molding material in (2-4), the sheet or the film is used.
(2-8) An optical element in which the molding material in (2-5), the sheet or the film is used.
(2-9) An optical element in which the molding material in (2-6), the sheet or the film is used.

According to the present invention, by mixing polymers having atomic groups capable of forming an intermolecular hydrogen bond, a method that allows easily manufacturing a polymer mixture may be provided.

Furthermore, according to the present invention, a method that can endow the polymer or the copolymer after the mixing with flexibility can be provided.

Still furthermore, the present invention can provide the polymer or the copolymer having heat resistance, mechanical strength, optical properties and so on.

DESCRIPTION OF THE PREFERRED EMBODIMENTS

In the following, examples involving the present invention will be detailed.

A present invention discloses a pseudo cross-link type resin composition that comprises resins or a mixture thereof that is obtained by mixing together a polymer molecule that has an atomic group capable of forming an intermolecular hydrogen bond in a molecular side chain and/or at a molecular tail end of the polymer molecule, and a polymer molecule that has an atomic group capable of forming an intermolecular hydrogen bond in a molecular side chain and/or in a molecular skeleton of the polymer molecule, and thereby forming the intermolecular hydrogen bond therebetween.

<1> A Polymer Molecule Having an Atomic Group Capable of Forming an Intermolecular Hydrogen Bond in a Molecular Side Chain and/or at a Molecular Tail End A polymer molecule having an atomic group capable of forming an intermolecular hydrogen bond in a molecular side chain and/or at a molecular tail end is a polymer molecule having a structure in which in a molecular side chain and/or at a molecular tail end of a vinylic polymer and/or a copolymer that is a main constituent of the polymer molecule, a carboxyl group or a hydroxyl group is introduced (hereinafter referred to as "polymer molecule A").

In the present invention, the vinylic polymer and/or copolymer of the polymer molecule A may be an ordinary vinylic polymer and/or copolymer and is made of an ordinarily used vinylic monomer. The vinylic monomer is not restricted to particular ones when the obtained polymer and/or copolymer is not deteriorated in its transparency.

As specific examples, acrylic esters such as methyl acrylate, ethyl acrylate, propyl acrylate, n-butyl acrylate, i-butyl acrylate, t-butyl acrylate, pentyl acrylate, n-hexyl acrylate, 2-ethylhexyl acrylate, n-octyl acrylate, dodecyl acrylate, octadecyl acrylate, butoxyethyl acrylate, phenyl acrylate, benzyl acrylate, naphthyl acrylate, glycidyl acrylate, 2-hydroxyethyl acrylate, cyclohexyl acrylate, methyl cyclohexyl acrylate, tri-methyl cyclohexyl acrylate, norbornyl acrylate, norbornyl methyl acrylate, cyano norbornyl acrylate, isobornyl acrylate, bornyl acrylate, menthyl acrylate, phentyl acrylate, adamantyl acrylate, dimethyl adamantyl acrylate, tri-cyclo $[5.2.1.0^{2,6}]$ deca-8-yl acrylate, tri-cyclo $[5.2.1.0^{2,6}]$ deca-4-methyl acrylate, and cyclodecyl acrylate; methacrylic esters such as ethyl methacrylate, propyl methacrylate, n-butyl methacrylate, i-butyl methacrylate, t-butyl methacrylate, pentyl methacrylate, n-hexyl methacrylate, 2-ethylhexyl methacrylate, n-octyl methacrylate, dodecyl methacrylate, octadecyl methacrylate, butoxyethyl methacrylate, phenyl methacrylate, naphthylmethacrylate, glycidylmethacrylate, cyclopentyl methacrylate, cyclohexyl methacrylate, methyl cyclohexylmethacrylate, tri-methylcyclohexylmethacrylate, norbornyl methacrylate, norbornylmethyl methacrylate, cyanonorbornyl methacrylate, phenylnorbornyl methacrylate, isobornyl methacrylate, bornyl methacrylate, menthyl methacrylate, phentyl methacrylate, adamantyl methacrylate, dimethyladamantyl methacrylate, tri-cyclo $[5.2.1.0^{2,6}]$ deca-8-ylmethacrylate, tri-cyclo $[5.2.1.0^{2,6}]$ deca-4-methyl methacrylate, and cyclodecyl methacrylate; aromatic vinyl compounds such as α-methyl styrene, α-ethyl styrene, α-fluoro styrene, α-chloro styrene, α-bromo styrene, fluoro styrene, chloro styrene, bromo styrene, methyl styrene, and methoxy styrene; metal (meth) acrylates such as calcium acrylate, barium acrylate, lead acrylate, tin acrylate, zinc acrylate, calcium methacrylate, barium methacrylate, lead methacrylate, tin methacrylate, and zinc methacrylate; unsaturated fatty acids such as acrylic acid and methacrylic acid; vinyl cyanide compounds such as acrylonitrile and methacrylonitrile; maleimides such as N-methyl maleimide, N-ethyl maleimide, N-propyl maleimide, N-i-propyl maleimide, N-butyl maleimide, N-i-butylmaleimide, N-t-butylmaleimide, N-laurylmaleimide, N-cyclohexyl maleimide, N-benzyl maleimide, N-phenyl maleimide, N-(2-chlorophenyl)maleimide, N-(4-chlorophenyl) maleimide, N-(4-bromophenyl)phenyl maleimide, N-(2-methylphenyl)maleimide, N-(2-ethylphenyl)maleimide, N-(2-methoxylphenyl)maleimide, N-(2,4,6-trimethylphenyl) maleimide, N-(4-benzylphenyl) maleimide, and N-(2,4,6-tribromophenyl)maleimide can be cited. These can be used singly or in a combination of two or more thereof. However, these shown above are cited as one example and the vinyl monomers are not restricted to the above.

The polymer molecule A in the present invention can be obtained by copolymerizing the vinyl monomers described above with the following monomers containing a carboxyl group or a hydroxyl group.

For instance, acrylic acid, 2-hydroxy ethyl acrylate, 2-hydroxy propyl acrylate, 2-hydroxy butyl acrylate, 2-acryloiloxy ethyl succinate, 2-acryloiloxy ethyl hexahydro phthalate, 2-acryloiloxy ethyl-2-hydroxy propyl phthalate, 2-acryloiloxy ethyl acid phosphate, 2-hydroxy-3-acryloiloxy propyl acrylate, methacrylic acid, 2-hydroxy ethyl methacrylate, 2-hydroxy propyl methacrylate, 2-hydroxy butyl methacrylate, 2-methacryloiloxy ethyl succinate, 2-methacryloiloxy ethyl hexahydro phthalate, 2-methacryloiloxy ethyl-2-hydroxy propyl phthalate, 2-methacryloiloxy ethyl acid phosphate, 2-hydroxy-3-methacryloiloxy propyl acrylate, vinyl benzoic acid, vinyl benzoate, and their derivatives can be cited. However, these compounds shown above are examples and the polymer molecules are not restricted to these.

When the present component and other vinylic monomer are copolymerized, a copolymerizing ratio of the present component, from the viewpoint of solubility, is preferable to be 2 mol % or more, more preferable to be 5 mol % or more, and furthermore preferable to be in the range of 5 to 50 mol %. However, these values shown above are examples and the values are not restricted to these.

As a method for manufacturing the polymer molecule A in the present invention, an existing method such as block polymerization, suspension polymerization, emulsion polymerization, solution polymerization and so on can be applied with the aforementioned appropriate raw materials.

When carrying out the polymerization, a polymerization initiator can be used. As the polymerization initiator, any one that can be used in an ordinary radical polymerization such as organic peroxides such as benzoyl peroxide, lauroyl peroxide, di-t-butylperoxyhexahydroterephthalate, t-butylperoxy-2-ethylhexanoate, 1,1-t-butylperoxy-3,3,5-trimethylcyclohexane; azo compounds such as azobisisobutyronitrile, azobis-4-methoxy-2,4-dimethylvaleronitrile, azobiscyclohexanon-1-carbonitrile, and azodibenzoyl; water-soluble catalysts such as potassium persulfate, ammonium persulfate and so on; and redox catalysts due to a combination of a peroxide or persulfate and a reducing agent can be used. Ones that are shown above are examples and the polymerization initiator is not restricted to the above. The polymerization initiator is preferably used in the range of from 0.01 to 10% by weight to a total amount of the monomer used in manufacturing the polymer molecule A.

Furthermore, as a molecular weight regulator, as the need arises, mercaptanic compounds, thioglycol, carbon tetrachloride, α-methyl styrene dimmer and soon can be added. These shown above are examples and the molecular weight regulators are not restricted to the above.

When the polymerization is carried out due to thermal polymerization, a polymerization temperature can be appropriately selected in the range of 0 to 200° C., being preferable to be in the range of 50 to 120° C.

The polymer molecule A of the present invention is not particularly restricted in its molecular weight. However, from the viewpoint of mechanical strength and moldability, its weight average molecular weight (in terms of polystyrene) is preferable to be in the range of 10,000 to 1,000,000.

<2> Polymer Molecule Having an Atomic Group Capable of Forming an Intermolecular Hydrogen Bond in a Molecular Side Chain and/or in a Molecular Skeleton A polymer molecule having an atomic group capable of forming an intermolecular hydrogen bond in a molecular side chain and/or in a molecular skeleton is a polymer molecule having a structure in which at least one or more nitrogen atoms are introduced in a molecular side chain and/or in a molecular skeleton of a vinylic polymer and/or copolymer that is a main constituent of the polymer molecule (hereinafter referred to as "polymer molecule B").

In the present invention, the vinylic polymer and/or copolymer of the polymer molecule B may be an ordinary vinylic polymer and/or copolymer and may be made of an ordinarily used vinylic monomer. As the vinylic monomer, one that is similar to the monomer used in the polymer molecule A can be used.

The polymer molecule B of the present invention can be obtained by introducing a monomer having at least one nitrogen atom in a molecular side chain and/or in a molecular skeleton of an ordinary vinylic polymer and/or copolymer. As a method for introducing a nitrogen atom in a molecular side chain and/or in a molecular skeleton, when polymerizing the vinylic monomers, the following monomers need only be copolymerized.

For instance, dimethyl amino ethyl acrylate, diethyl amino ethyl acrylate, diethyl amino ethyl methacrylate, dimethyl amino ethyl methacrylate, (meth) acrylamides such as acrylamide, methacrylamide, N-dimethyl acrylamide, N-diethyl acrylamide, N-dimethyl methacrylamide and N-diethyl methacrylamide; and vinylpyridine and its derivatives can be cited. These compounds shown above are examples, and the monomers are not restricted to these compounds.

Furthermore, when at least one or more of nitrogen atom is introduced in the skeleton of the polymer molecule B, the aforementioned monomer is preferably copolymerized by 2 mol % or more, more preferably by 5 mol % or more, still more preferably in the range of from 5 to 50 mol % with the vinylic monomer constituting a main structure of the polymer molecule B. When the aforementioned monomer is copolymerized by less than 2 mol %, since the number of intermolecular hydrogen bonds between the polymer molecule A and the polymer molecule B becomes scarce, the solubility may be deteriorated and the transparency of an obtained resin composition tends to be deteriorated. Accordingly, it is preferably copolymerized by 2 mol % or more with the aforementioned vinylic monomer.

As a method for manufacturing the polymer molecule B in the present invention, an existing method such as block polymerization, suspension polymerization, emulsion polymerization, solution polymerization and so on can be applied with the aforementioned appropriate raw materials.

When carrying out the polymerization, a polymerization initiator can be used. As the polymerization initiator, any one that can be used in an ordinary radical polymerization such as organic peroxides such as benzoyl peroxide, lauroyl peroxide, di-t-butylperoxyhexahydroterephthalate, t-butylperoxy-2-ethylhexanoate, 1,1-t-butylperoxy-3,3,5-trimethylcyclohexane; azo compounds such as azobisisobutyronitrile, azobis-4-methoxy-2,4-dimethylvaleronitrile, azobiscyclohexanon-1-carbonitrile, and azodibenzoyl; water-soluble catalysts such as potassium persulfate, ammonium persulfate and so on; and redox catalysts due to a combination of a peroxide or persulfate and a reducing agent can be used. Ones that are shown above are examples and the polymerization initiator is not restricted to the above. The polymerization initiator is preferably used in the range of from 0.01 to 10% by weight to a total amount of the monomer used in manufacturing the polymer molecule B.

Furthermore, as a molecular weight regulator, as the need arises, mercaptanic compounds, thioglycol, carbon tetrachloride, α-methyl styrene dimmer and so on can be added. These shown above are examples and the molecular weight regulator is not restricted to the above.

When the thermal polymerization is carried out, a polymerization temperature can be appropriately selected in the range of 0 to 200° C., being preferable to be in the range of 50 to 120° C.

The polymer molecule B of the present invention is not restricted to a particular value in its molecular weight. From the viewpoint of mechanical strength and moldability, its weight average molecular weight (in terms of polystyrene) is preferable to be in the range of 10,000 to 1,000,000.

<3> Pseudo Cross-Link Type Resin Composition of the Present Invention

A pseudo cross-link type resin composition in the present invention can be obtained by mixing the polymer molecule A set forth in the <1> and the polymer molecule B set forth in the <2>.

In the present invention, the pseudo cross-link type resin composition denotes a resin composition that is cross-linked through the hydrogen bond. In addition, the "pseudo" means that the cross-link structure can be broken with heat (at a thermal decomposition temperature or less) or solution and so on, and when the temperature is lowered or the solution is removed, the cross-link structure can be recovered.

In the present invention, a method of mixing the polymer molecule A and the polymer molecule B may be melt-kneading method, varnish-mixing method and so on. The mixing method is not restricted to a particular one.

When the above polymer molecule A and the polymer molecule B are mixed, any mixing ratio of the two polymer molecules A and B may be adopted as far as the transparency of the obtained resin composition can be secured. However, when the respective characteristics of the polymer molecule A and the polymer molecule B are utilized, it is preferable to mix these with a mole ratio in the range of from 2/1 to 1/2.

In the present invention, the glass transition temperature of the polymer molecule A is preferably different from that of the polymer molecule B. Furthermore, it is preferable for the glass transition temperature of one of the two polymer molecules A and B is set equal to or less than room temperature and that of the other one thereof is set equal to or more than room temperature.

With the above configuration, the obtained pseudo cross-link type resin composition can be endowed with heat resistance and flexibility. When the temperature is out of the above temperature conditions, problems may be caused in that the flexibility is not endowed at room temperature and thermal deformation is caused. That is, there is caused no problem when the glass transition temperatures of the polymer molecules A and B satisfy the aforementioned conditions. However, it is preferable for the glass transition temperature of one of these A and B to be +10° C. or less and for that of the other one to be +50° C. or more, being more preferable for the glass transition temperature of one of these A and B to be 0° C. or less and for that of the other one to be +100° C. or more.

In order to endow the flexibility, the glass transition temperature of one of the polymer molecules A and B is necessary to be set at room temperature or less, preferably at 25° C. or less, and the one of the polymer molecules A and B may be either one thereof. Accordingly, when an arbitrary polymer molecule is manufactured, by copolymerizing with a monomer whose glass transition temperature as a single polymer is lower than room temperature (preferably less than 0° C.), the polymer molecule can be prepared into one that has the glass transition temperature equal to or less than a target glass transition temperature.

The glass transition temperature can be measured in the following ways.

By measuring the glass transition temperature by use of DSC (Differential Scanning Calorimeter), it can be evaluated. The measurement due to the DSC is performed under the condition of a temperature-raising rate of 10° C./min.

By mixing the polymer molecules A and B, hydrogen bonds are newly formed between polymer molecule chains, thereby a pseudo cross-link type resin composition in which a pseudo cross-link structure is formed can be obtained.

The pseudo cross-link type resin composition of the present invention can be processed into molding material, sheet or film. In the present invention, when the resin composition is processed into the molding material, sheet or film, as needs arise, arbitrary components can be added. For instance, from the viewpoint of anti-deterioration, thermal stability, moldability and workability, an anti-oxidant such as phenolic, phosphitic, thioetheric and so on, a mold lubricant such as aliphatic alcohol, fatty acid ester, phthalate ester, triglycerides, fluorinated surfactant, higher fatty acid metal salt and soon, in addition to the above, a lubricant, a plasticizer, an anti-static agent, an ultraviolet absorber, a flame retardant, a heavy metal deactivator and so on may be added and used.

In the present invention, from the obtained polymer molecule, film and sheet can be obtained by evaporating an organic solvent by means of a melt kneading method or solvent casting method.

Although the casting conditions are not restricted to particular conditions, the casting may be performed in, for instance, air or inert gas at a temperature in the range of 80 to 160° C. Furthermore, after preparatory drying is performed under the above conditions, the film may be peeled and further dried at a high temperature in the range of 160 to 350° C., thereby a drying time period may be shortened.

The obtained sheet or film is tough and flexible, and excellent in mechanical properties. Since the obtained film or sheet has suitable flexibility, it results in suitable folding properties as shown later in examples. In addition, since contact with, in particular, glass and metals such as aluminum, copper and so on is intimate, in forming into the film or sheet, it is important to select an appropriate casting substrate. Specifically, although stainless steel, PET film, Teflon (registered trademark) film or the like can be selected, as far as the contact with an involving polymer molecule is low, any casting substrate can be used.

As optical elements that utilize the molding material, sheet or film that is obtained owing to the present invention, pick-up lens for use in CDs, pick-up lens for use in DVDs, lens for use in FAXes, lens for use in LBPs, polygon mirrors, prism or the like can be cited.

Since products obtained from the pseudo cross-link type resin compositions of the present invention have excellent heat resistance and can be used under high temperature conditions, the range of application of the products may be expanded. Furthermore, since the products obtained from the pseudo cross-link type resin compositions of the present invention have suitable flexibility and mechanical strength and can be easily handled and processed, allowance in the manufacturing process and in the product design may be expanded. Still furthermore, since the products obtained from the pseudo cross-link type resin compositions of the present invention are high in the light transmittance and low in the birefringence, these can be suitably used as optical elements. When these are used as elements for, for instance, laser beam printers, high precision printing may be realized; when used in optical disks, read and write accuracy may be improved; and when used in liquid crystal display devices, the contrast of the hue may be improved.

EXAMPLES

In the following, the present invention will be specifically explained with examples and comparative examples illustrated. However, the present invention is not restricted to the following examples.
<Measuring Methods>
(1) Glass Transition Temperature (Tg), Melting Temperature (Tm)
These temperatures are measured under the temperature-elevating rate condition of 10° C./min by use of a DSC. A DSC 8230 available from Rigaku Corporation is used as a measuring apparatus.
(2) Folding Property (Flexibility)
When the film is folded, whether or not there is fissure or blushing is visually inspected.
(3) Total Light Transmittance
The total light transmittance of the film is measured by use of a spectrophotometer in the wavelength range of from 400 to 800 nm at room temperature. The measuring apparatus is a V-570 available from JASCO.
(4) Observation of Phase Separation
The phase separation at the mixing of the polymer is visually observed.
(5) Birefringence
The birefringence is measured of 50 μm thick film. A measuring apparatus is an Ellipsometer AEP-100 available from Shimadzu Corporation.
Abbreviated names and manufacturers' names of materials used in the present invention will be shown in Table 1.

82 g, tricyclo methacrylate $[5.2.1.0^{2,6}]$ deca-8-yl (TCDMA) 5 g, benzyl methacrylate (BzMA) 13 g and vinylpyridine (VP) 5.1 g (5 mol %) are weighed, and azobisisobutyronitrile 0.4 g is added to a mixture of monomers as a polymerization initiator and dissolved. Thereafter, the mixture is poured into the flask. Further thereafter, a nitrogen gas purge is carried out at room temperature for substantially 1 hr and thereby dissolved oxygen is replaced, followed by elevating a temperature up to 70° C. under the nitrogen gas flow. By maintaining the same temperature for substantially 8 hrs, a polymer molecule solution is obtained. At this time, a polymerization rate is 98% or more.
<Preparation of Resin Composition>
The obtained polymer molecule A solution and the polymer molecule B solution are mixed with a 1:1 ratio and the mixed solution is coated on a glass plate. Thereafter, by heating and drying the solvent, substantially 50 μm thick film is prepared and supplied for test sample for evaluation. Results are shown in Table 2.

Example 2

Except for mixing the obtained polymer molecule A solution and the polymer molecule B solution with a mixing ratio of 1:2, similarly to the procedure of example 1, a test sample for evaluation is obtained. Results are shown in Table 2.

Example 3

Except for mixing the obtained polymer molecule A solution and the polymer molecule B solution with a mixing ratio of 2:1, similarly to the procedure of example 1, a test sample for evaluation is obtained. Results are shown in Table 2.

Example 4

Except for preparing the polymer molecule A with 10.5 g of 2-acryloiloxy ethyl succinate (HOA-MS) in place of 3.5

TABLE 1

| Name of Product | Abbreviated Name | Name of Maker |
| --- | --- | --- |
| Methyl Methacrylate | MMA | Asahi Chemical Industry Co., Ltd. |
| Butyl Acrylate | BA | Wako Pure Chemical Industries, Ltd. |
| Benzyl Methacrylate | BzMA | Kyoeisha Chemical Co., Ltd. |
| Tricyclo $[5.2.1.0^{2,6}]$ deca-8-yl Methacrylate | TCDMA | Hitachi Chemical Company, Ltd. |
| Acrylic Acid | AA | Wako Pure Chemical Industries, Lid. |
| Vinyl Pyridine | VP | Wako Pure Chemical Industries, Ltd. |
| 2-Acryloiloxy Ethyl Succinate | HOA-MS | Kyoeisha Chemical Co., Ltd. |
| Di-ethylaminoethyl Methacrylate | DE | Kyoeisha Chemical Co., Ltd. |
| Lauroyl Peroxide | LPO | Nippon Oil & Fats Co., Ltd. |
| Azobisisobutyronitrile | AIBN | Wako Pure Chemical Industries, Ltd. |

Example 1
<Preparation of Polymer Molecule A>
As a polymerization solvent, 200 g of toluene is poured into a 500 mL four-neck flask. Methyl methacrylate (MMA) 40 g, butyl acrylate (BA) 60 g and acrylic acid (AA) 3.5 g (5 mol %) are weighed, and lauroyl peroxide 0.4 g is added to a mixture of monomers as a polymerization initiator and dissolved. Thereafter, the mixture is poured into the flask. Further thereafter, a nitrogen gas purge is carried out at room temperature for substantially 1 hr and thereby dissolved oxygen is replaced, followed by elevating a temperature up to 70° C. under the nitrogen gas flow. By maintaining the same temperature for substantially 8 hrs, a polymer molecule solution is obtained. At this time, a polymerization rate is 98% or more.
<Preparation of Polymer Molecule B>
As a polymerization solvent, 200 g of toluene is poured into a 500 mL four-neck flask. Methyl methacrylate (MMA)

g of AA in the polymer molecule A, similarly to the procedure of Example 1, a test sample for evaluation is obtained. Results are shown in Table 2.

Example 5

Except for preparing the polymer molecule B with 9.0 g of di-ethyl amino ethyl methacrylate in place of 5.1 g of VP in the polymer molecule B, similarly to the procedure of Example 1, a test sample for evaluation is obtained. Results are shown in Table 2.

Example 6

Except for mixing the polymer molecule A solution obtained in example 4 and the polymer molecule B solution obtained in example 5 with a mixing ratio of 1:1, similarly to the procedure of example 1, a test sample for evaluation is obtained. Results are shown in Table 2.

TABLE 2

| Item | Unit | Example 1 | Example 2 | Example 3 | Example 4 | Example 5 | Example 6 |
|---|---|---|---|---|---|---|---|
| Polymer Molecule A (Tg) | ° C. | −12 | −12 | −12 | −5 | −12 | −5 |
| Polymer Molecule B (Tg) | ° C. | 115 | 115 | 115 | 115 | 110 | 110 |
| Folding Properties | — | O | O | O | O | O | O |
| Phase Separation | — | O | O | O | O | O | O |
| Total Light Transmittance | % | 92 | 91 | 92 | 92 | 91 | 91 |
| Birefringence | nm/mm | −0.7 | −0.6 | −0.8 | −0.4 | −0.3 | −0.1 |

Comparative Example 1

Except for preparing the polymer molecule A without AA in the polymer molecule A, similarly to the procedure of example 1, a test sample is obtained. Results are shown in Table 3.

Comparative Example 2

Except for preparing the polymer molecule B without VP in the polymer molecule B, similarly to the procedure of example 1, a test sample is obtained. Results are shown in Table 3.

Reference Example 1

Except for preparing the polymer molecule A with AA used in the polymer molecule A increased from 40 g to 75 g and with BA reduced from 60 g to 25 g, similarly to the procedure of example 1, a test sample for evaluation is obtained. Results are shown in Table 3.

Reference Example 2

Except for preparing the polymer molecule B with 82 g of BA substituted for 82 g of MMA used in the polymer molecule B, similarly to the procedure of example 1, a test sample for evaluation is obtained. Results are shown in Table 3.

TABLE 3

| Item | Unit | Comparative example 1 | Comparative example 2 | Reference example 1 | Reference example 2 |
|---|---|---|---|---|---|
| Polymer molecule A (Tg) | ° C. | −17 | −12 | 35 | −12 |
| Polymer molecule B (Tg) | ° C. | 115 | 111 | 115 | −22 |
| Folding properties | — | X | X | X | X |
| Phase separation | — | X | X | O | O |
| Total light transmittance | % | 15 | 18 | 90 | 92 |
| Birefringence | Nm/mm | −0.8 | −1.2 | −0.6 | −0.5 |

What is claimed is:

1. A pseudo cross-link resin composition comprising at least two polymers;

wherein the resin composition is obtained by mixing a polymer A that has an atomic group capable of forming an intermolecular hydrogen bond in a molecular side chain and/or at a molecular tail end of the polymer molecule, and a polymer B that has an atomic group capable of forming an intermolecular hydrogen bond in a molecular side chain and/or in a molecular skeleton of the polymer molecule;

wherein the polymer A that has an atomic group capable of forming an intermolecular hydrogen bond in a molecular side chain and/or at a molecular tail end is a vinylic polymer and/or copolymer that has a carboxyl group in a molecular side chain and/or at a molecular tail end, and the polymer B that has the atomic group capable of forming an intermolecular hydrogen bond in a molecular side chain and/or in a molecular skeleton is a vinylic polymer and/or copolymer having at least one nitrogen atom in a molecular side chain and/or a molecular skeleton;

wherein one of the vinylic polymer and/or copolymer that has a carboxyl group in a molecular side chain and/or at a molecular tail end and the vinylic polymer and/or copolymer that has at least one nitrogen atom in a molecular side chain and/or in a molecular skeleton has a glass transition temperature equal to or lower than room temperature and the other has a glass transition temperature equal to or higher than room temperature;

wherein when the polymer A and the polymer B or copolymers thereof are mixed together, the intermolecular hydrogen bond is formed therebetween; and wherein when these vinylic polymers and/or copolymers are mixed, the pseudo cross-link resin composition can be endowed with flexibility.

2. A pseudo cross-link resin composition according to claim 1;

wherein the vinylic polymer and/or copolymer that has a carboxyl group in a molecular side chain and/or at a molecular tail end and the vinylic polymer and/or copolymer having at least one nitrogen atom in a molecular side chain and/or in a molecular skeleton are different in their glass transition temperatures.

3. A molding material obtained by molding the pseudo cross-link resin composition claimed in claim 1.

4. Film obtained from the pseudo cross-link resin composition claimed in claim 1.

5. Sheet obtained from the pseudo cross-link resin composition claimed in claim 1.

6. A pseudo cross-link resin composition according to claim 1, wherein the polymer A and the polymer B are mixed in a mole ratio of 2/1 to 1/2.

7. A pseudo cross-link resin composition according to claim 1, wherein one of polymer A and polymer B has a glass transition temperature of +10° C. or less, and the other of polymer A and polymer B has a glass transition temperature of +50° C. or more.

8. A pseudo cross-link resin composition according to claim 7, wherein the glass transition temperature of said one of polymer A and polymer B is 0° C. or less, and the glass transition temperature of said other of polymer A and polymer B is +100° C. or more.

* * * * *